United States Patent
Shoblom

[19]

[11] Patent Number: 6,089,907
[45] Date of Patent: Jul. 18, 2000

[54] BRACKET WITH ADAPTER FOR MOUNTING MULTIPLE TRAILER LIGHT/ ELECTRICAL CONNECTORS

[76] Inventor: Paul Michael Shoblom, 17314 13th Ave. Court East, Spanaway, Wash. 98387-7784

[21] Appl. No.: 08/837,205

[22] Filed: Apr. 14, 1997

[51] Int. Cl.$^7$ ....................................................... B60D 1/64
[52] U.S. Cl. ........................................... 439/528; 280/422
[58] Field of Search ............................ 439/35, 528, 142; 280/422

[56] References Cited

U.S. PATENT DOCUMENTS

| | | | |
|---|---|---|---|
| 4,772,220 | 9/1988 | Hallier, Jr. | 439/528 |
| 4,940,427 | 7/1990 | Pearson | 439/501 |
| 5,288,094 | 2/1994 | Putman | 280/422 |
| 5,380,209 | 1/1995 | Converse, Jr. et al. | 280/422 |

*Primary Examiner*—Neil Abrams

[57] ABSTRACT

A bracket for mounting up to three 12 volt trailer light/ electrical connectors to a receiver style trailer hitch. The bracket is capable of holding all the popular 12 volt trailer light/electrical connectors currently on the market, such as the 4 way, 5 way, 6 way, 7 way, 8 way and 9 way round connectors. The bracket (1) is also comprised of a storage compartment (2), with a spring loaded closure (8) for the 4 way flat connector and other similar connectors which do not have a mounting flange on them. The bracket (1) includes a rear support angle (24) and is designed to mount to the torsion/crosstube section of a receiver style trailer hitch by the use of two stainless steel hose clamps, which will not weaken the structural integrity of the trailer hitch assembly. An optional adapter tube/bracket (31) is available for particular trailer hitches where the mounting bracket (1) must be spaced downward to clear an obstruction such as the rear bumper of the tow vehicle. The bracket (1) may be fixed to the adapter tube/bracket (31) which in turn may be fixed to the torsion/crosstube (27). The storage compartment (2) is used to store the connector (16), which may be drawn out when to be connected to the plug of a trailer.

4 Claims, 8 Drawing Sheets

BRACKET WITH ADAPTER FOR MOUNTING MULTIPLE TRAILER LIGHT/ELECTRICAL CONNECTORS

BACKGROUND OF THE INVENTION

1. Field of the Invention

This invention relates to mounting brackets for 12 volt trailer light/electrical connectors, and in particular to a bracket that attaches to a factory receiver style trailer hitch assembly with two stainless steel hose clamps, and having the ability to hold several trailer light/electrical connectors at once.

2. Prior Art

Manufacturers of receiver style trailer hitches do not permit hitch installers or the customer to drill holes through, or fasten screws to, or cut or weld on the torsion tube section of the trailer hitch. This section is also referred to as the crosstube assembly. The reason for this is that while towing a large trailer with a weight distributing type of trailer hitch, the spring bars of the trailer hitch twist the torsion/crosstube section of the receiver hitch assembly. The torsion/crosstube will also twist when a trailer is towed without the use of spring bars, but to a lesser degree. Consequently since the torsion/crosstube section of the trailer hitch receiver assembly undergoes considerable stress while towing, any holes drilled through it, or screws screwed into it, or welding or cutting of any kind would weaken it considerably, thus voiding the manufacturers warranty.

The torsion/crosstube of the receiver style trailer hitch is usually the most convenient location to attach the mounting bracket for the trailer light/electrical connector. Other people have tried to solve the problem of attaching the lights/electrical connector bracket to the torsion/crosstube of a trailer hitch without weakening the tube. U.S. Pat. No. 5,288,094 to Putnam describes a bracket with a square U-shaped section to fit over the torsion/crosstube, and is secured by sandwiching the tube between the two flanges of the bracket by use of two draw bolts. A drawback to this design is that several sizes of brackets would be necessary to fit the various hitches with varying sizes of torsion/crosstubes. Another inconvenience is that in most instances the trailer hitch would have to be unbolted from the frame of the vehicle in order to attach the bracket. Also this bracket sacrifices ground clearance, which is very important on a trailer hitch, since it is usually the trailer hitch that bottoms out when going over a bump or dip in the road because it is the farthest thing back on the vehicle and this bracket is only capable of holding one electrical connector at a time.

U.S. Pat. No. 5,380,209 to Converse and Hayes describes a trailer light connector enclosure. This design is made specifically to house "light connectors" such as the 4 way flat connector which is very popular on boat trailers and small utility trailers without electrical brakes. This type of light connector does not have a mounting flange, so it is necessary to have an enclosure such as this.

The drawback to this design is that it is not capable of mounting the larger "electrical" connectors that have mounting flanges. The type of connector that this enclosure is designed for is a 4 way connector and is referred to as a "light" connector because it has only enough wires to supply lights only, such as running lights, turn signals and brake lights. Where as the larger connectors with mounting flanges such as the 6, 7 and 9 way connectors supply not only lights but also electricity for the electric brake control, charging of the breakaway battery on the tongue of the larger trailers, backup lights, and 12 volt refrigerator operation, and so are referred to as "electrical connectors". These larger "electrical connectors" such as the 6 way, 7 way and 9 way are used on most travel trailers, horse trailers and larger utility trailers and require a bracket with 2 to 4 holes for the connector to bolt to.

U.S. Pat. No. 4,772,220 to Martin J. Hallier Jr. describes a clip for receiving and retaining a trailer wiring connector. This clip bracket is only capable of holding a 4 way flat style trailer "light connector" and cannot accommodate the larger style "electrical connectors" with mounting flanges.

U.S. Pat. No. 4,940,427 to Linnea H. Pearson describes an electrical trailer connector retainer. This retainer is only capable of holding a 4 way flat style trailer "light connector" and cannot accommodate the larger style "electrical connectors" with mounting flanges.

SUMMARY OF THE INVENTION

The principal object of the present invention is to provide a mounting bracket that is capable of holding up to three 12 volt trailer light/electrical connectors. It is also an object of the present invention to provide a trailer light/electrical connector bracket which can be easily and securely mounted to a receiver style trailer hitch by the use of two stainless steel hose clamps which will not damage the trailer hitch. Another object is to provide a trailer hitch mounting bracket which will incorporate into its design an enclosure with a spring loaded lid for housing a style of trailer "light" connectors which are to be stored in the enclosure when not in use. A further object is to provide an optional adapter tube/bracket which is to be used when the trailer hitches torsion/crosstube is inaccessible to the mounting bracket by itself.

The foregoing objects can be accomplished by providing a mounting bracket for 12 volt trailer light/electrical connectors which is comprised of a mounting flange for supporting the larger trailer electrical connectors, and another mounting flange for supporting the smaller electrical connectors, and an enclosure with a spring loaded lid for housing a style of trailer "light" connector which has no mounting flange.

In the preferred embodiment of the invention a 90° formed angle at the rear supports the weight of the bracket with the light/electrical connectors, and is secured to the torsion/crosstube of the trailer hitch by the use of two stainless steel hose clamps which will not weaken any of the trailer hitches integrity.

In particular situations where the top of the trailer hitches torsion/crosstube is inaccessible to the rear support angle of the mounting bracket, an optional adapter tube/bracket is made available. This adapter tube/bracket fastens to the bottom of the trailer hitches torsion/crosstube with two stainless steel hose clamps. These two stainless steel hose clamps pass through two slots that are located at the extreme top of the adapter tube/bracket, and these slots are through two of the walls of the square tubing (adapter tube/bracket) exactly opposite each other. The adapter tube bracket can be fastened either on the left side or the right side of the receiver tube of the trailer hitch, which is also the case with the mounting bracket by itself. Before the hose clamps of the adapter tube/bracket are tightened completely, the horizontal flange of the support angle at the rear of the mounting bracket is placed between the adapter tube and the trailer hitches torsion/cross tube, and the two hose clamps of the mounting bracket are then tightened securely around the adapter tube/bracket. After the mounting bracket is secured to the adapter tube/bracket, the other two hose clamps of the adapter tube/bracket are then tightened securely around the torsion/crosstube of the trailer hitch. After this procedure has been completed the mounting bracket will have been spaced downward to clear the obstruction, which in most cases is usually the rear bumper of the tow vehicle.

DETAILED DESCRIPTION

Figure 1:
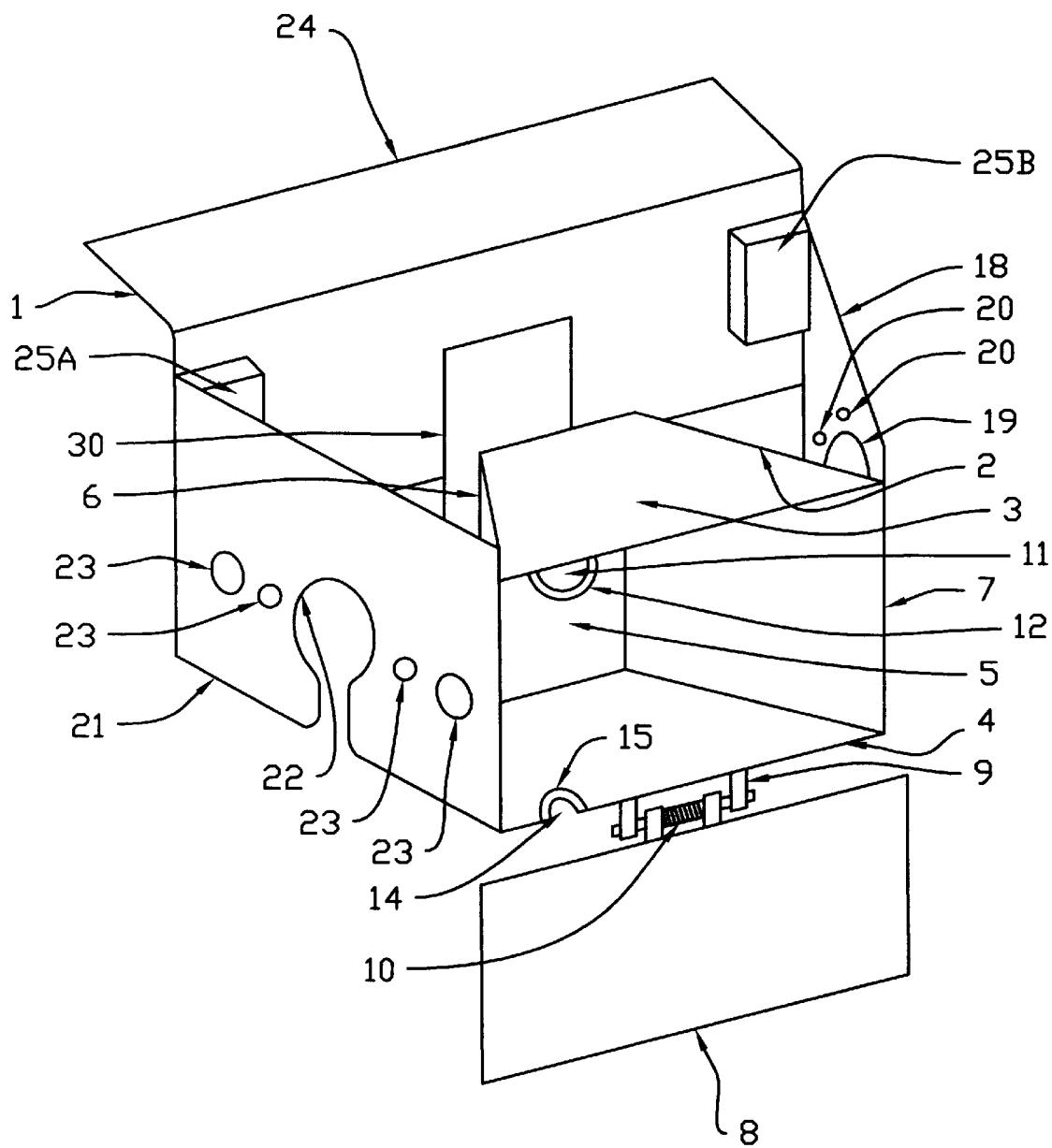
FIG. 1 is a perspective view of the bracket for mounting multiple trailer light/electrical connectors with the front spring loaded closure in the fully open position.

Refer now to FIG. 1 which is an overall drawing of a preferred embodiment of the invention. As shown in the drawing the preferred mounting bracket for up to three 12 volt trailer light/electrical connectors in accordance with the present invention will be referred to as bracket 1, and it is comprised of an enclosure 2 for containment of the type of trailer "light" receptacle 16 which is a non-fixed connector to be stored in enclosure (2) when not in use and to be drawn out when needed. The enclosure 2 comprises a top 3, a bottom 4, and back wall 5. Two angled sides 6 and 7, and a front closure 8 connected to bottom 4 with a hinge 9 and torsion spring 10. The back wall 5 has an access hole 11 with a rubber grommet 12 for the light connector wiring 13. The bottom 4 of enclosure 2 has a wiring access opening 14 with grommet 15 which is used when the wiring receptacle 16 is connected to the wiring plug of the trailer while it is being towed.

The right side of the bracket 1 has a mounting flange 18 that is set at the correct angle so as the "electrical" connectors will clear each other and the back wall 5 of enclosure 2, and also clear the rear support angle 24. Mounting flange 18 has an aperture 19 sized for the larger twelve volt "electrical" connectors. The mounting flange 18 has six attachment holes 20 which are used for mounting the larger and medium sized "electrical" connectors. The left hand side of the bracket 1 has a mounting flange 21 that is also set at the correct angle so as the "electrical" connectors will clear each other and the back wall 5 of the enclosure 2 and also clear the rear support angle 24. Mounting flange 21 has an aperture 22 sized for the medium to small sized "electrical" connectors that have mounting flanges. Both apertures 19 and 22 are slotted on the bottoms to allow access for installing prewired "electrical" connectors. The mounting flange 21 has four attachment holes 23 which are used for mounting medium to small sized "electrical connectors.

Figure 2:
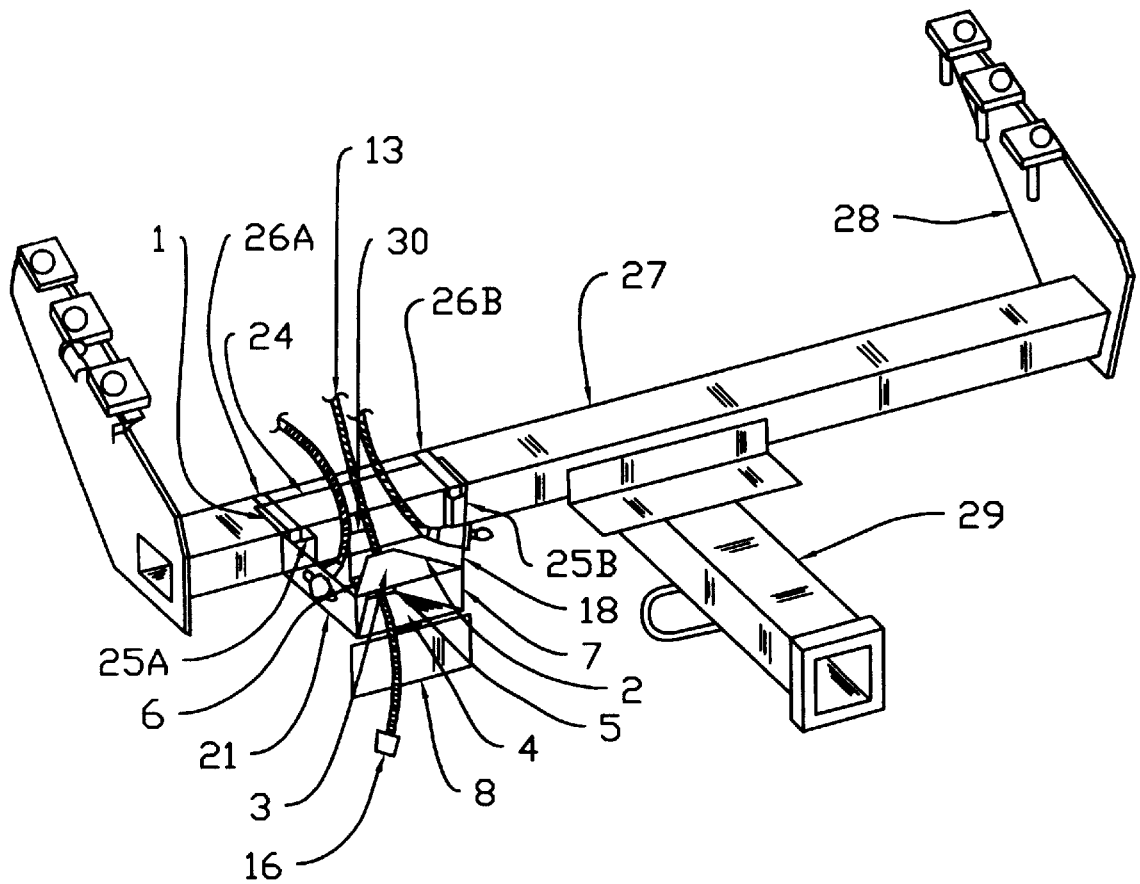
FIG. 2 is a perspective view of the trailer light/electrical connector mounting bracket attached to the torsion/crosstube of a receiver style trailer hitch assembly by the use of two stainless steel hose clamps, and holding three trailer light/electrical connectors with the spring loaded front closure in the fully open position.
Figure 3:
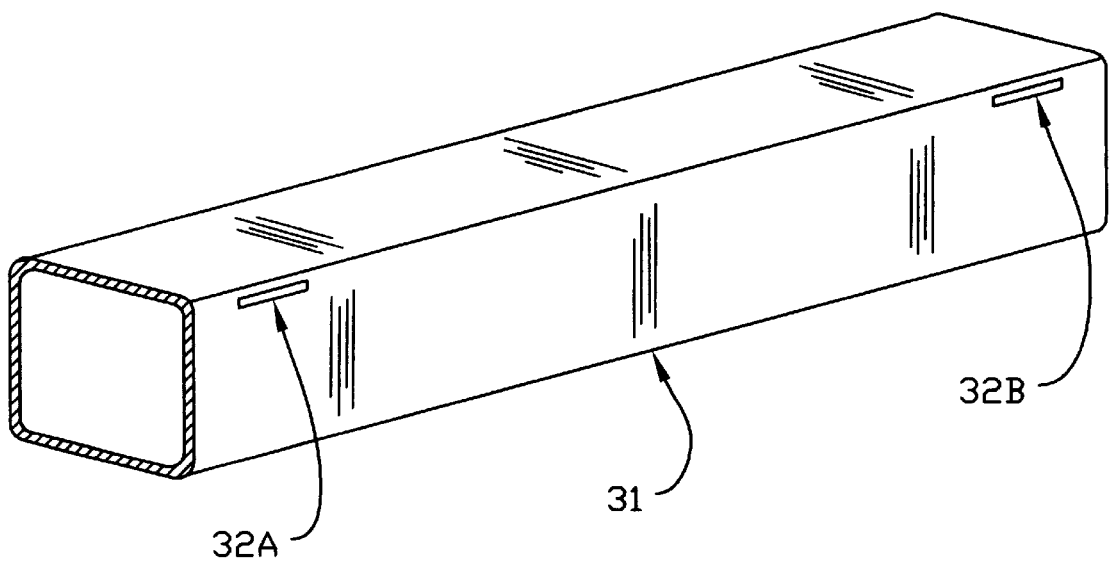
FIG. 3 is a perspective view of the adapter tube/bracket.
Figure 8:
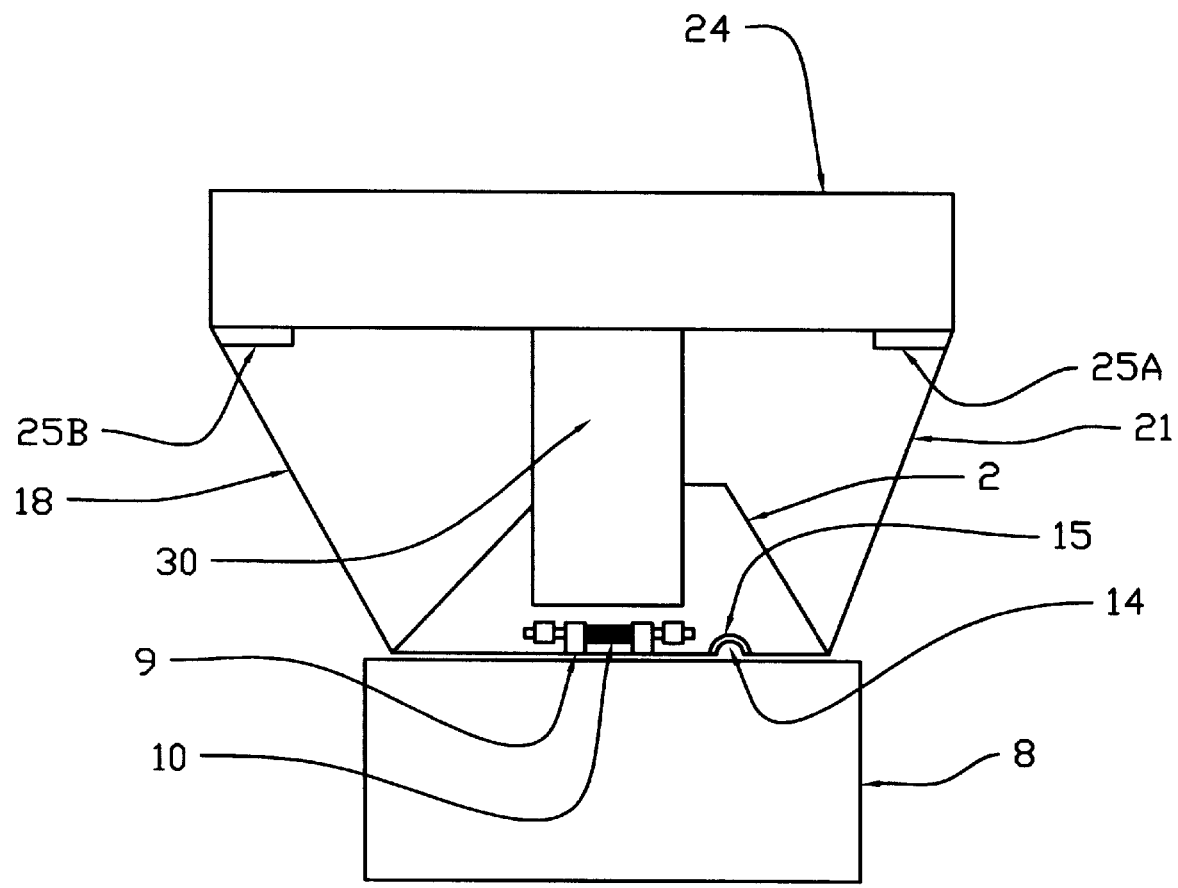
FIG. 8 is a bottom view of the trailer light/electrical connector mounting bracket with the spring loaded front closure in the open position.

The back edges of mounting flanges 18 and 21 are connected to a 90° formed support angle 24. Reinforcing the joints between mounting flanges 18 and 21 and the rear support angle 24 are gussets 25A and 25B, which also serve to form passages for receiving stainless steel hose clamps 26A and 26B which are used to mount bracket 1 to the torsion/cross tube 27 of trailer hitch assembly 28 shown in FIG. 2. Bracket 1 can be mounted either on the left side or the right side of the receiver tube 29. Connecting the rear support angle 24 to the bottom 4 of enclosure 2 is the reinforcing angle 30, shown in FIG. 8.

Bracket 1 will be made of various types of sheet metal such as mild steel or stainless steel, or can also be made from a strong molded plastic material.

Figure 4:
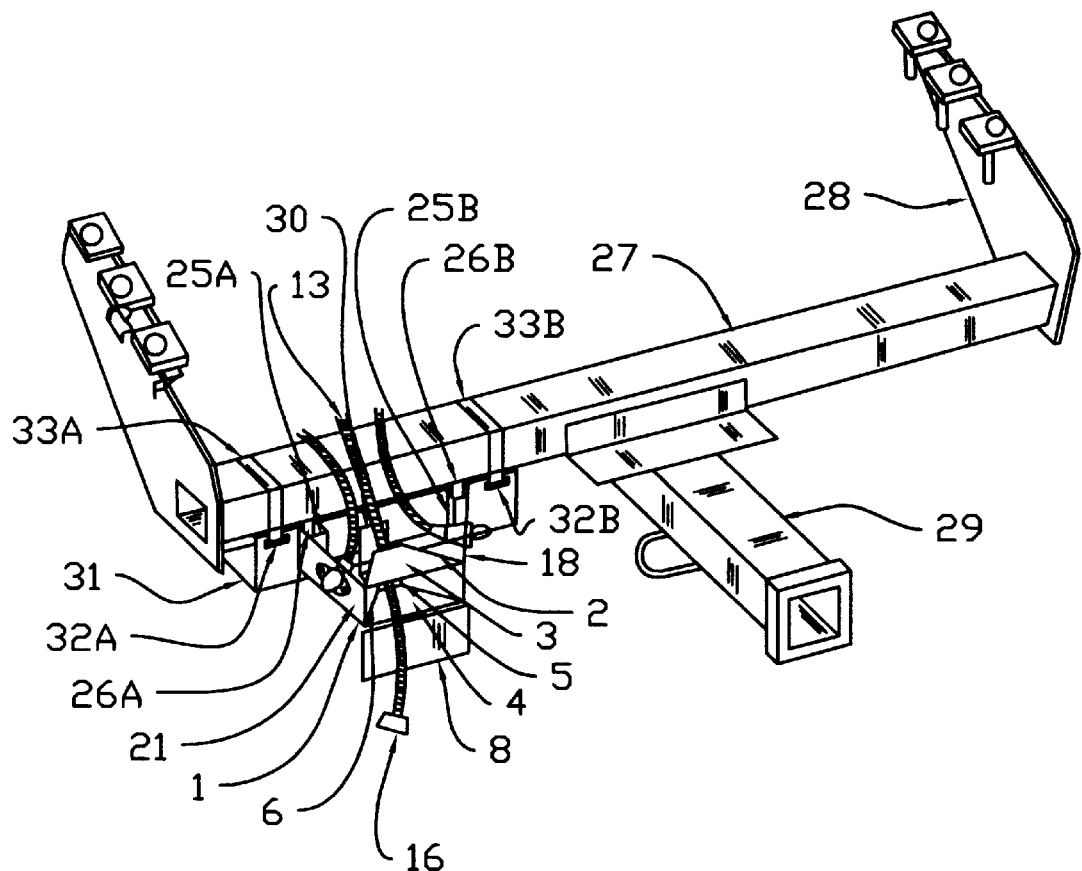
FIG. 4 is a perspective view of a second arrangement of the trailer light/electrical connector mounting bracket with three trailer light/electrical connectors, shown with the spring loaded front closure in the fully open position, and attached to the FIG. 3 adapter tube/bracket with two stainless steel hose clamps, which in turn is attached to the torsion/crosstube of a receiver style trailer hitch with two more stainless steel hose clamps, whereby the mounting bracket may be spaced downwardly to avoid obstructions on the rear bumper of the tow vehicle.
Figure 5:
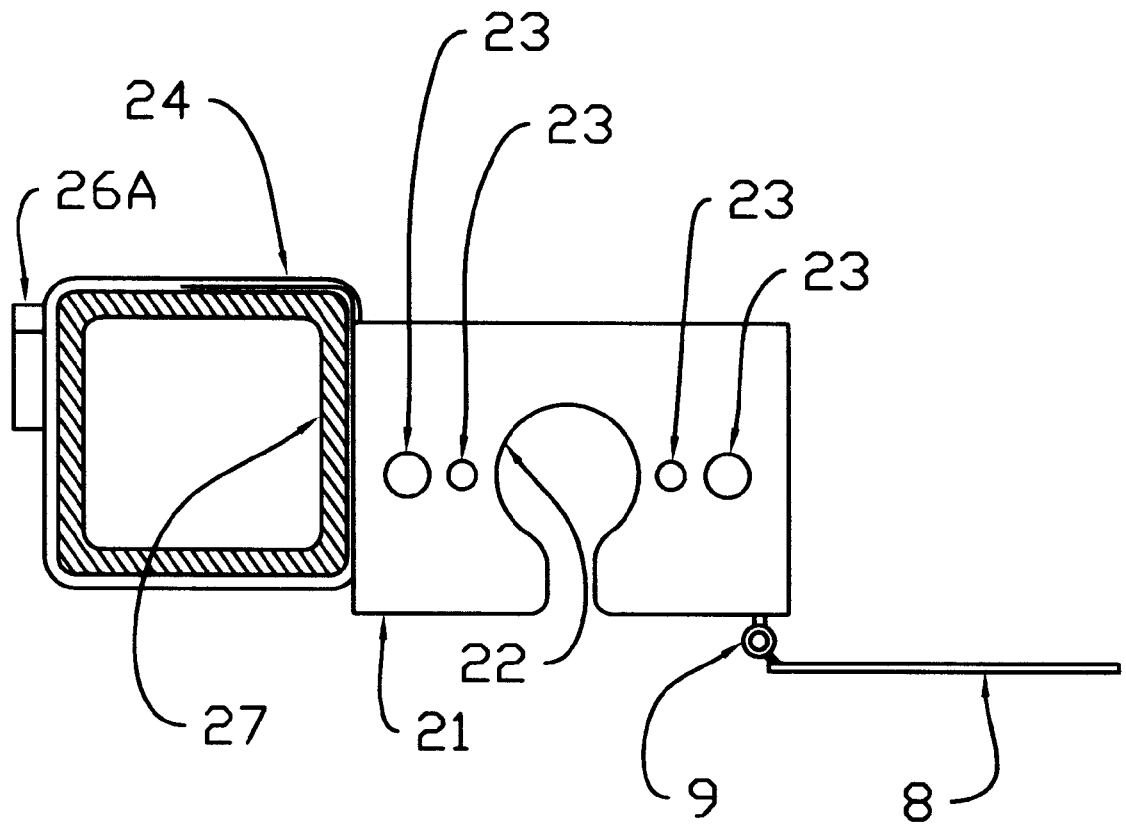
FIG. 5 is a left side view of the FIG. 2 trailer light/electrical connector mounting bracket, shown with the spring loaded front closure in the open position and mounted to a cross section of the torsion/crosstube of a receiver style trailer hitch.
Figure 6:
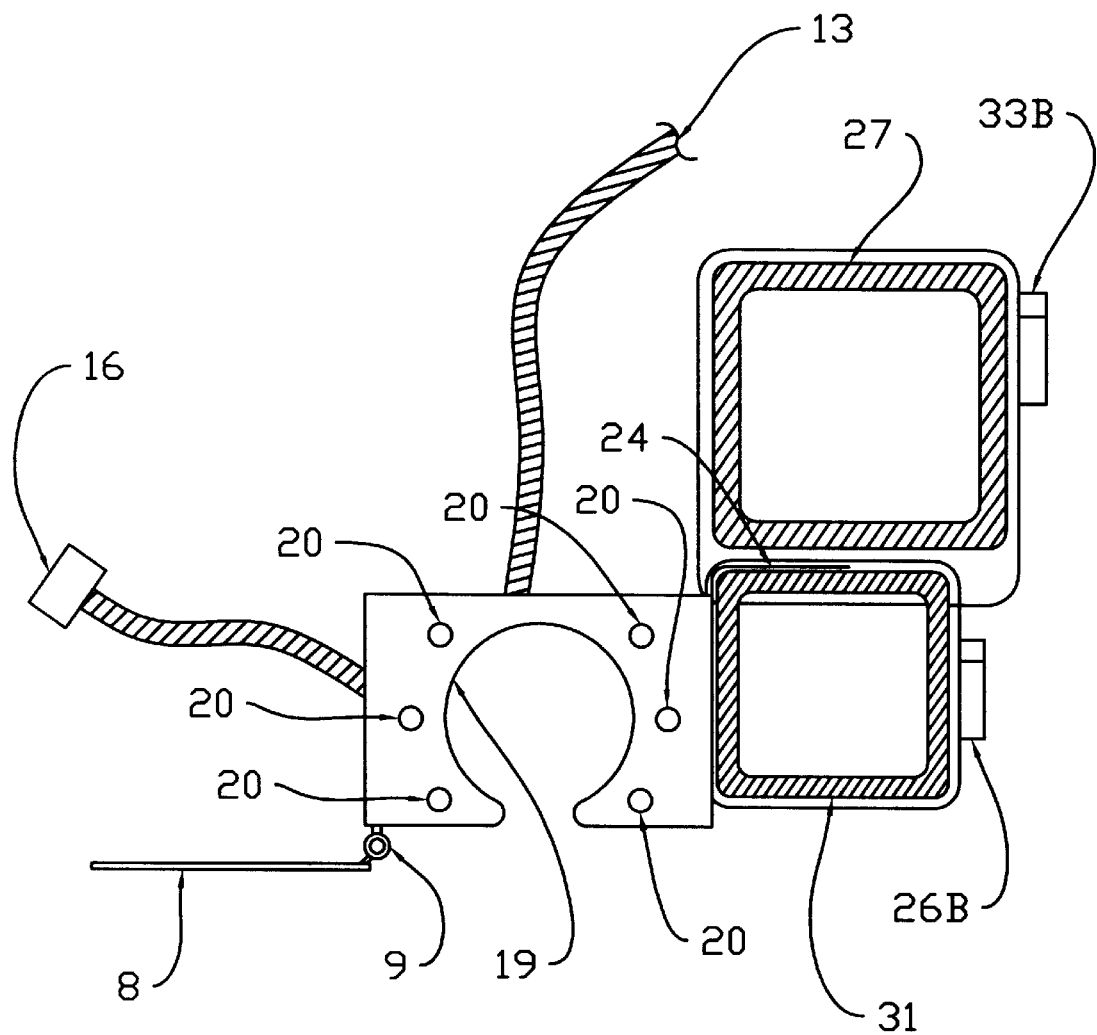
FIG. 6 is a right side view of the trailer light/electrical connector mounting bracket, shown with the spring loaded front closure in the open position.
Figure 7:
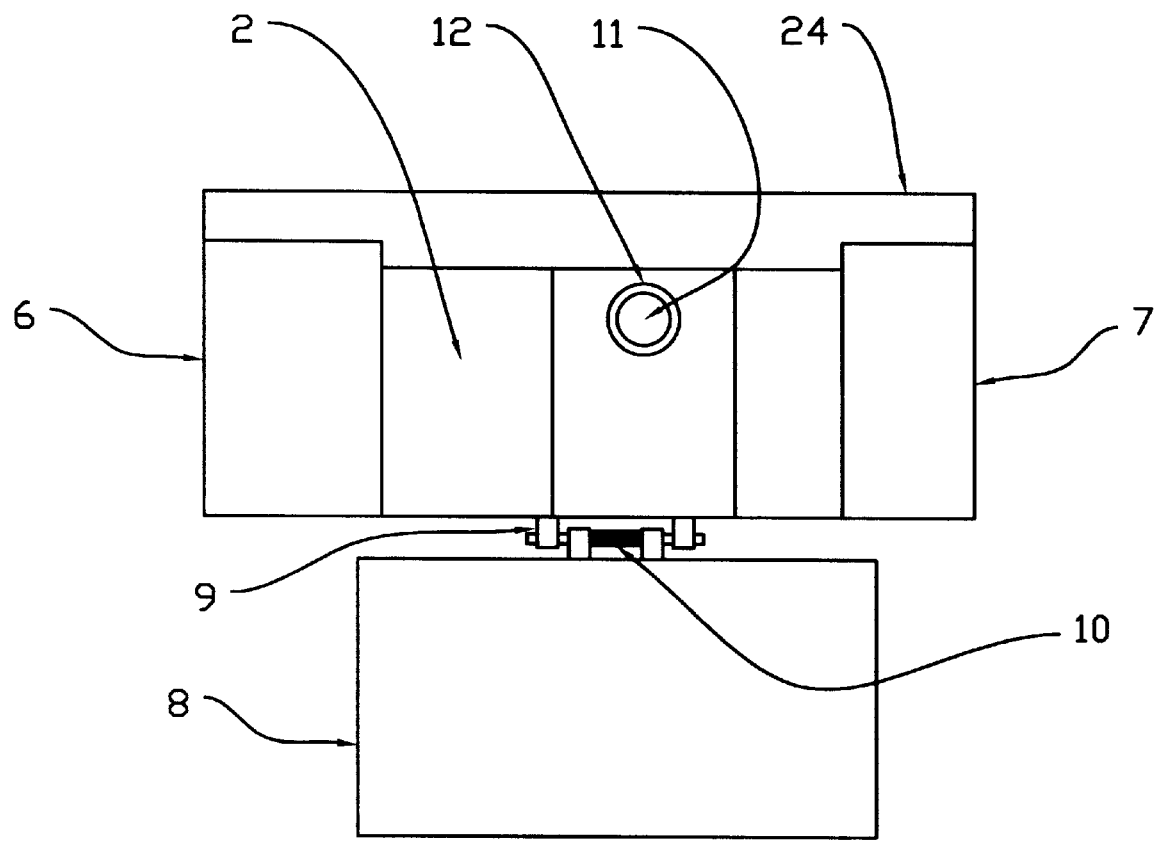
FIG. 7 is a front view of the trailer light/electrical connector mounting bracket with the spring loaded front closure in the fully open position.

FIG. 4 is a modified arrangement in which bracket (1) is to be spaced downward to clear obstructions by using adapter tube/bracket 31. Adapter tube/bracket 31 is a thin wall steel square tube and has two mounting slots 32A and 32B that are located at the extreme top of the adapter tube/bracket 31 and these slots 32A and 32B are cut through two of the walls of the square tubing (adapter tube/bracket 31) exactly opposite each other. Two stainless steel hose clamps 33A and 33B pass through the two mounting slots 32a and 32B cut through adapter tube bracket 31, and then around the torsion/cross tube 27 of the trailer hitch assembly 28. Before the two stainless steel hose clamps 33A and 33B of adapter tube/bracket 31 are tightened completely, the horizontal flange of the support angle 24 at the rear of bracket 1 is placed between the top of adapter tube/bracket 31 and the bottom of torsion/cross tube 27, and then the two stainless steel hose clamps 26A and 26B of bracket 1 are tightened securely around the adapter tube/bracket 31. After the mounting bracket 1 is secured to the adapter tube/bracket 31, the other two stainless steel hose clamps 33A and 33B of adapter tube/bracket 31 are then tightened securely around the torsion/crosstube 27 of the trailer hitch assembly 28. After this procedure has been completed the mounting bracket 1 will have been spaced downward to clear the obstruction, which in most cases is usually the rear bumper of the tow vehicle.

The versatility of the mounting bracket 1 is in its capability to accommodate all of the trailer light/electrical connectors on the market today. It can hold one, two, or up to three electrically charged connectors. By tapping into the wiring of the largest connector through the use of modern wire taps, the other two smaller connectors will also be electrically charged. This method is less expensive than making up male to female electrical adapters. It would take one 7 way trailer receptacle wired up and two male to female adapters which would equal a total of five connectors to do the same job that three female receptacles wired up on this bracket could accomplish. The compact and novel design of bracket 1 will not sacrifice ground clearance, and by attaching it with hose clamps will not weaken the structural integrity of the trailer hitch. Also when bracket 1 is used in combination with the adapter tube bracket 31 it ill fit almost all the factory receiver style trailer hitches currently on the market today.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A bracket for mounting up to three 12 volt trailer light/electrical connectors to the torsion/crosstube of a receiver style trailer hitch which comprises:

(a). two mounting flanges for supporting round style trailer electrical connectors and an enclosure for the style of trailer lights connectors which are to be stored in the enclosure when not in use; and (b). a rear support angle wherein the two mounting flanges and enclosure are all connected to each other as one unit, and the rear support angle is to be mounted to the torsion/crosstube by securing means.

2. The bracket of claim 1 wherein said enclosure comprises a spring loaded closure.

3. The bracket of claim 1 wherein the securing means is comprised of two stainless steel hose clamps.

4. A square tube which is used as an adapter tube/bracket to space the mounting bracket of claim 1 downward on particular trailer hitch assemblies which comprises:

(a). two slots cut through two opposing walls of the square tube for securing means; and (b). two stainless steel hose clamps that pass through the two slots in the adapter tube/bracket and are used to secure said adapter tube/bracket to the torsion/crosstube of a receiver style trailer hitch assembly.

* * * * *